United States Patent Office 2,907,753
Patented Oct. 6, 1959

2,907,753
MANUFACTURE OF POLYMETHYLENE TEREPHTHALATE IN THE ABSENCE OF A CATALYST

Duncan Maclean, Norman Standring, Philip V. Youle, and Neil Munro, Harrogate, England, assignors to Imperial Chemical Industries Limited, London, England, a corporation of Great Britain No Drawing. Application July 5, 1956
Serial No. 595,869

Claims priority, application Great Britain July 6, 1955

1 Claim. (Cl. 260—75)

This invention relates to the manufacture of polyesters, more particularly to the manufacture of highly polymeric polymethylene terephthalates.

In the manufacture of the highly polymeric polymethylene terephthalates, which polyesters are of great commercial importance as fibre, film and moulding materials, a common manner of manufacture is by the ester-interchange under atmospheric conditions of a dialkyl terephthalate, e.g. dimethyl terephthalate, with a glycol of the series $HO(CH_2)_nOH$, where $n$ is an integer from 2 to 10 inclusive, e.g. ethylene glycol, and polycondensing the product of the ester-interchange reaction until a high molecular weight polyester is formed.

In order to obtain economic rates of production, it has been found necessary to make use of catalysts in the ester-interchange reaction, for example, zinc acetate, and in the polycondensation reaction, for example, antimony oxide.

Difficulty has been experienced in the past in preventing degradation of the highly polymeric polymethylene terephthalate, and in obtaining a polymer of a colour suitable for purposes where absence of colour in the final product was of primary importance. It is thought that this is, at least in part, caused by the use of ester-interchange catalysts which tend to bring about polymer degradation and formation of colour in the polymer.

According to the present invention, we provide an improved process for the manufacture of highly polymeric polymethylene terephthalates, characterised in that an alkyl ester of terephthalic acid is reacted with a glycol of the series $HO(CH_2)_nOH$, where $n$ is an integer from 2 to 10 inclusive, under superatmospheric pressure in the presence of water and the ester-interchange product is polycondensed preferably in the absence of a catalyst.

The ester-interchange reaction when undertaken in the presence of water is thought to create carboxyl groups by hydrolysis which speed up the final polycondensation so that the use of catalysts may be dispensed with in both the ester-interchange and, if desired, polycondensation stages.

The following example, in which all parts and percentages are by weight, illustrates but in no way limits the scope of our invention.

Example 194 parts dimethyl terephthalate, 155 parts ethylene glycol and 180 parts of water are agitated and heated to 250° C. in an autoclave for 1 hour. The maximum pressure attained is 700 lb. per square inch, when the temperature is lowered to 220° C. and the pressure lowered to 30 lb. per square inch over 1½ hours. The distillate collected consists of water, methanol and some glycol. No residual dimethyl terephthalate can be detected in the reaction products which are then polycondensed over 1 hour 20 minutes at 275° C. and under vacuum (0.05 mm.) without added catalyst, to give a polymer having an intrinsic viscosity of 0.62 (1% o-chlorphenol at 25° C.).

By comparison, if the example is undertaken in the absence of water, incomplete ester-interchange is obtained.

What we claim is:

A process for the manufacture of fiber- and film-forming polymethylene terephthalate which comprises conducting an ester-interchange reaction between a di-lower alkyl terephthalate ester and a glycol of the formula $HO(CH_2)_nOH$, wherein $n$ is an integer from 2 to 10 inclusive, in the absence of a catalyst, under superatmospheric pressure conditions up to a pressure of about 700 lb. per square inch and an elevated temperature up to about 250° C. and in the presence of a substantial quantity of added water in an amount approximately equal to the weight of di-lower alkyl terephthalate ester present, and subsequently polycondensing said ester-interchange product in the absence of a catalyst and at an elevated temperature up to about 275° C. and under vacuum.

References Cited in the file of this patent

UNITED STATES PATENTS

| | | |
|---|---|---|
| 2,465,319 | Whinfield | Mar. 22, 1949 |
| 2,479,066 | Gresham | Aug. 16, 1949 |
| 2,647,885 | Billica | Aug. 4, 1953 |

OTHER REFERENCES

Groggins: Unit Processes in Organic Synthesis, 4th ed., page 615, Mc-Graw-Hill Book Co., Inc., New York, 1952. (Copy in Scientific Library.)